(12) United States Patent
Wang et al.

(10) Patent No.: US 8,375,173 B2
(45) Date of Patent: Feb. 12, 2013

(54) ACCESSING A MULTI-CHANNEL MEMORY SYSTEM HAVING NON-UNIFORM PAGE SIZES

(75) Inventors: Feng Wang, San Diego, CA (US); Matthew Michael Nowak, San Diego, CA (US); Jonghae Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 12/576,693

(22) Filed: Oct. 9, 2009

(65) Prior Publication Data

US 2011/0087846 A1    Apr. 14, 2011

(51) Int. Cl.
G06F 12/00 (2006.01)
G06F 13/00 (2006.01)
G06F 13/28 (2006.01)

(52) U.S. Cl. ......... 711/147; 711/154; 711/173; 710/317

(58) Field of Classification Search .................. 711/147, 711/154, 173; 710/317
See application file for complete search history.

(56) References Cited

U.S. PATENT DOCUMENTS

| | | | |
|---|---|---|---|
| 5,958,045 A | 9/1999 | Pickett | |
| 6,003,121 A | 12/1999 | Wirt | |
| 6,041,016 A | 3/2000 | Freker | |
| 6,065,092 A | 5/2000 | Roy | |
| 6,076,139 A | 6/2000 | Welker et al. | |
| 6,108,343 A | 8/2000 | Cruickshank et al. | |
| 6,212,612 B1 | 4/2001 | Turner | |
| 6,445,394 B1 | 9/2002 | Chow et al. | |
| 6,477,621 B1 * | 11/2002 | Lee et al. | 711/120 |
| 6,552,935 B2 | 4/2003 | Fasoli | |
| 6,571,325 B1 | 5/2003 | Satagopan et al. | |
| 2006/0067146 A1 | 3/2006 | Woo et al. | |
| 2007/0266206 A1 | 11/2007 | Kim et al. | |
| 2009/0228668 A1 * | 9/2009 | Borkenhagen | 711/161 |
| 2009/0255713 A1 * | 10/2009 | Dangler et al. | 174/250 |
| 2010/0060312 A1 * | 3/2010 | Toms | 326/16 |

FOREIGN PATENT DOCUMENTS

EP    0843261 A2    5/1998

OTHER PUBLICATIONS

Tanenbaum, Andrew, Structured Computer Organization, 1984, Prentice-Hall.*
International Search Report and Written Opinion—PCT/US2010/051865- International Search Authority, European Patent Office, Jan. 25, 2011.

* cited by examiner

*Primary Examiner* — Jared Rutz
*Assistant Examiner* — Ryan Bertram
(74) *Attorney, Agent, or Firm* — Sam Talpalatsky; Nicholas J. Pauley; Jonathan T. Velasco (57) ABSTRACT

A method includes predicting a memory access pattern of each master of a plurality of masters. The plurality of masters can access a multi-channel memory via a crossbar interconnect, where the multi-channel memory has a plurality of banks. The method includes identifying a page size associated with each bank of the plurality of banks. The method also includes assigning at least one bank of the plurality of banks to each master of the plurality of masters based on the memory access pattern of each master.

43 Claims, 6 Drawing Sheets

ACCESSING A MULTI-CHANNEL MEMORY SYSTEM HAVING NON-UNIFORM PAGE SIZES

I. FIELD

The present disclosure is generally related to accessing a multi-channel memory system having non-uniform page sizes.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones also incorporate other types of devices. For example, a wireless telephone can also include a digital still camera, a digital video camera, a digital recorder, and an audio file player. As such, the wireless telephones can include multiple processors that access multi-channel memory via multiple masters.

In a system with multiple masters, the multiple masters may access different types of data stored at a multi-channel memory. Using a uniform page size to store different types of data at a multi-channel memory may result in increased page open power (e.g. the power required to open a particular page for access) or fewer page hits. For example, using a large page size to store data at a multi-channel memory may increase a number of page hits but may result in an increase in page open power because of the larger page size. Using a small page size to store data at a multi-channel memory may use less page open power than a large page size when opening the page but may result in fewer page hits.

III. SUMMARY

In a system with multi-channel memory that has non-uniform page sizes, one or more channels are assigned to a master based on a memory requirement of the master and based on a non-uniform page size associated with each channel of the multi-channel memory. Assigning channels to the master based on the memory requirement of the master and based on the non-uniform page size associated with each channel of the multi-channel memory may increase a page hit rate of the master and may reduce page open power.

In a particular embodiment, an apparatus includes a crossbar interconnect configured to predict a memory requirement of a master having access to a multi-channel memory. The crossbar interconnect is further configured to identify a page size associated with each channel of the multi-channel memory. The crossbar interconnect is further configured to assign a first particular channel of the multi-channel memory to the master based on the predicted memory requirement of the master and based on the page size associated with the first particular channel.

In another particular embodiment, a method includes predicting a memory access pattern of each master of a plurality of masters. The plurality of masters can access a multi-channel memory via a crossbar interconnect, where the multi-channel memory has a plurality of banks. The method includes identifying a page size associated with each bank of the plurality of banks. The method also includes assigning at least one bank of the plurality of banks to each master of the plurality of masters based on the memory access pattern of each master.

One particular advantage provided by at least one of the disclosed embodiments is an increase in a page hit rate of memory accesses of a master. Increasing the page hit rate of memory accesses of a master may reduce the number of pages opened to find a page having the requested data. Another particular advantage provided by at least one of the disclosed embodiments is a reduction in page open power. Reducing page open power may prolong battery life in a portable electronic device. Other aspects, advantages, and features of the present disclosure will become apparent after review of the entire application, including the following sections: Brief Description of the Drawings, Detailed Description, and the Claims.

V. DETAILED DESCRIPTION

Figure 1:
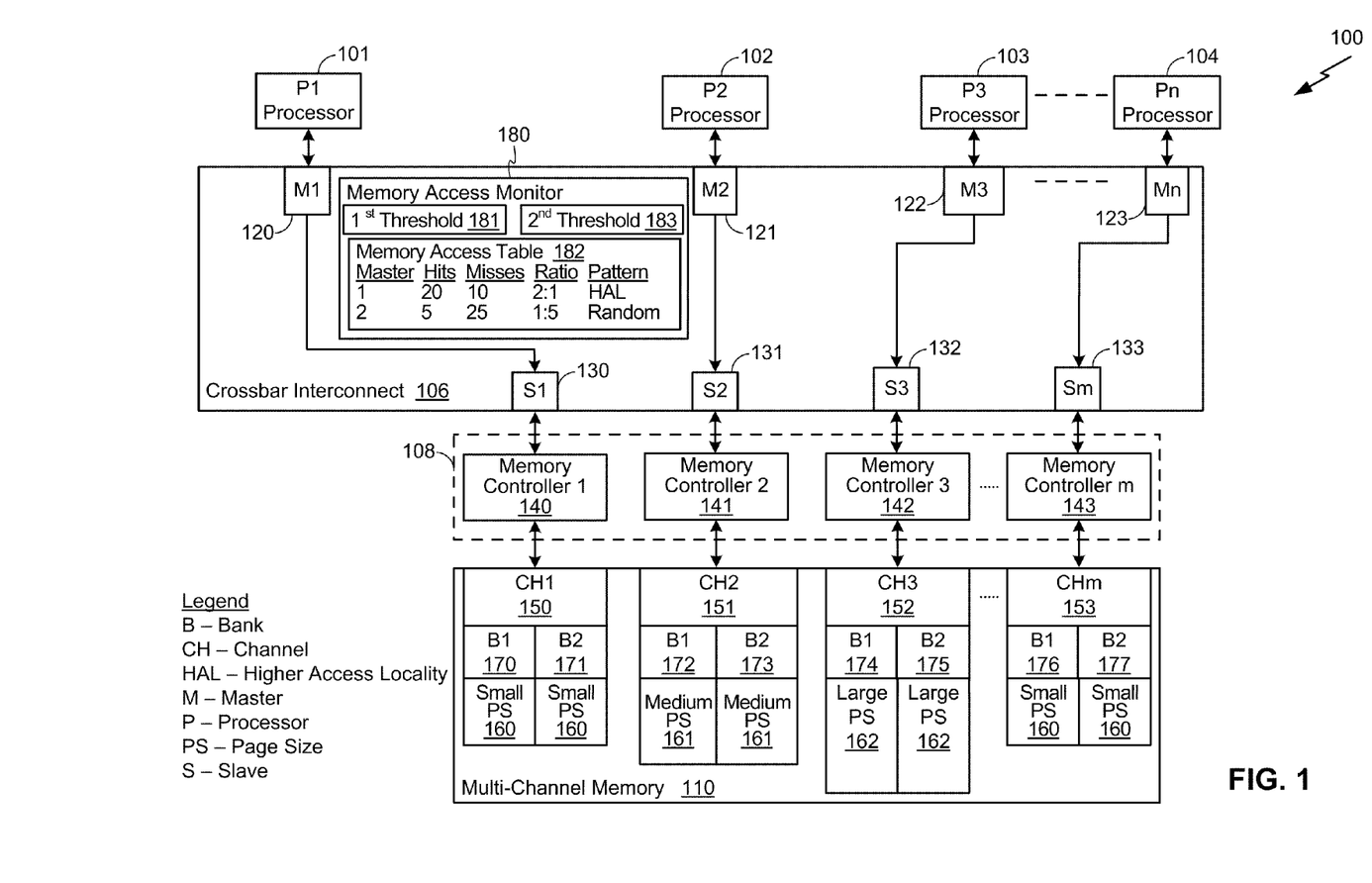
FIG. 1 is a block diagram of a first illustrative embodiment of a system to access a multi-channel memory system having non-uniform page sizes.

Referring to FIG. 1, a block diagram of a first illustrative embodiment of a system to access a multi-channel memory system having non-uniform page sizes is depicted and generally designated 100. The system 100 includes a first processor 101, a second processor 102, a third processor 103, and an $n^{th}$ processor 104 that can use a crossbar interconnect 106 and memory controllers 108 to access a multi-channel memory 110.

In the system 100, n represents a total number of processors. The processors 101-104 may represent various processors that may be used to perform specialized functions in an electronic device. For example, the processors 101-104 may include a display control processor, a wireless control processor, a Coder-Decoder (CODEC) processor, Digital Signal Processor (DSP), other type of processor, or any combination thereof. The processors 101-104 may access data stored at the multi-channel memory 110 via the crossbar interconnect 106. For example, the processors 101-104 may read or write to portions of the multi-channel memory 110 via the crossbar interconnect 106.

The multi-channel memory 110 includes a first channel 150, a second channel 151, a third channel 152, and an $m^{th}$ channel 153, where m is the number of channels of the multi-channel memory 110. Each channel 150-153 of the multi-channel memory 110 may have one or more memory banks In the system 100, the first channel 150 has a first bank 170 and a second bank 171, the second channel 151 has a first bank 172 and a second bank 173, the third channel 152 has a first bank 174 and a second bank 175, and the m$^{th}$ channel 153 has a first bank 176 and a second bank 177. The multi-channel memory 110 may store data using non-uniform page sizes. In a particular embodiment, two page sizes (e.g. a large page size and a small page size) may be used to implement non-uniform page sizes in the multi-channel memory 110. In another particular embodiment, more than two page sizes may be used. For example, three page sizes (e.g. a large page size, a medium page size, and a small page size) may be used to implement non-uniform page sizes in the multi-channel memory 110.

In the system 100, the banks 170-171 have a small page size 160, the banks 172-173 have a medium page size 161, the banks 174-175 have a large page size 162, and the banks 176-177 have the small page size 160. In a particular embodiment, the multi-channel memory 110 may be dual-data rate (DDR) memory. In another particular embodiment, the multi-channel memory 110 may be Through-Silicon Stacking (TSS) DDR memory. The multi-channel memory 110 may have an input/output operation width of at least 128 bits. The multi-channel memory 110 may be accessed via a first memory controller 140, a second memory controller 141, a third memory controller 142, and an m$^{th}$ memory controller 143.

The crossbar interconnect 106 includes a first master 120, a second master 121, a third master 122, an n$^{th}$ master 123, a first slave 130, a second slave 131, a third slave 132, an m$^{th}$ slave 133, and a memory access monitor 180. The crossbar interconnect 106 may include more one or more fabrics, where each fabric enables access to a subset of the multi-channel memory 110. For example, the crossbar interconnect 106 may enable access to several types of multi-channel memory and may therefore have multiple fabrics. The masters 120-123 may be bus masters that take control of a portion of the crossbar interconnect 106 in order to access the multi-channel memory 110. The masters 120-123 may receive commands to access the multi-channel memory 110 from the processors 101-104. To access the multi-channel memory 110, a particular master of the masters 120-123 may send a memory access request to a particular slave of the slaves 130-133 and the particular slave may access one or more of the banks 170-177 of the multi-channel memory 110 via one of the memory controllers 140-143. After accessing the multi-channel memory 110, the particular slave of the slaves 130-133 may send a result of the memory access to the particular master of the masters 120-123. The particular master may send the result of the memory access to the processor that requested the memory access. For example, the first processor 101 may send a request to the first master 120 to read a particular memory location of the multi-channel memory 110. The first master 120 may receive the request from the first processor 110 and send a memory access request to the first slave 130 via the crossbar interconnect 106. The first slave 130 may receive the memory access request from the first master 120 and send a memory access request to the first memory controller 140. The first memory controller 140 may receive the memory access request, perform the memory access request to the multi-channel memory 110, and return a result of the memory access request to the first slave 130. The first slave 130 may send the result of the memory access request to the first master 120. The first master 120 may send the result of the memory access request to the first processor 101.

The memory access monitor 180 includes a first threshold 181, a memory access table 182, and a second threshold 183. In a system that uses two page sizes (e.g. a small page size and a large page size) a single threshold may be used. The statistics related to memory accesses by a particular master of the masters 120-123 may be gathered over a predetermined time interval, and the data may be compared to the first threshold 181. When the data related to the particular master is less than the first threshold 181, a channel having the small page size 160 may be assigned to the particular master. When the data related to the particular master is greater than or equal to the first threshold 181, a channel having the large page size 162 may be assigned to the master. In a system that uses three page sizes (e.g. a small page size, a medium page size, and a large page size) two or more thresholds may be used. In such an embodiment, when the data related to the particular master is less than the first threshold 181, a channel having the small page size 160 may be assigned to the particular master. When the data related to the particular master is greater than or equal to the first threshold 181 but less than the second threshold 182, a channel having the medium page size 161 may be assigned to the master. When the data related to the particular master is greater than or equal to the second threshold 182, a channel having the large page size 162 may be assigned to the particular master.

The memory access monitor 180 may predict a memory requirement of a master of the masters 120-123, identify a page size associated with each channel 150-153 of the multi-channel memory 110, and assign a particular channel of the multi-channel memory 110 to the master. The memory access monitor 180 may assign the particular channel of the multi-channel memory 110 to the master based on the predicted memory requirement of the master, the page size associated with the particular channel of the multi-channel memory 110, a type of processor associated with the master, a type of content accessed by the master, or any combination thereof. For example, the memory access monitor 180 may assign the third channel 152 to the first master 120 after determining that the first processor 101 is a video processor that has more hits when accessing the large page size 162 of the multi-channel memory 110.

The memory access monitor 180 may also predict a memory requirement of one or more of the masters 120-123 based on the memory access table 182. The memory access table 182 may store data, such as various statistics, related to memory accesses for each of the masters 120-123. For example, the memory access monitor 180 may use the memory access table 182 to store a number of page hits by each of the masters 120-123 over a period of time and a number of page misses by each of the masters 120-123 over a period of time. The memory access monitor 180 may use the statistics, such as the page hits and page misses of each master, to determine a ratio of page hits to page misses for each of the masters 120-123. The memory access monitor 180 may compare the ratio of page hits to page misses of a master to the first threshold 181 to determine a memory access pattern associated with each master. For example, the memory access monitor 180 may determine that a particular master of the masters 120-123 has a random memory access pattern when the ratio of page hits to page misses of the particular master is less than the first threshold 181. In response, the crossbar interconnect 106 may assign the first channel 150 that has the small page size 160 to the particular master. By using the small page size 160, small pages that use less page open power may be opened. As another example, the memory access monitor 180 may determine that a particular master of the masters 120-123 has a Higher Access Locality (HAL)

memory access pattern when the ratio of page hits to page misses of the master is greater than or equal to the first threshold 181. In response, the crossbar interconnect 106 may assign the third channel 152 that has the large page size 162. When the particular master has a HAL access pattern, data accessed by the particular master may be stored in clusters, such that portions of the data are located close together. By using the large page size 162, fewer pages may be opened to access the data. Opening fewer pages may reduce page open power. The memory access monitor 180 may determine that a particular master of the masters 120-123 may assign the channel 151 that has the medium page size 161 to the master when the ratio of page hits to page misses is greater than the first threshold 181 and less than the second threshold 183.

In operation, the memory access monitor 180 may initially predict a memory requirement of a particular master of the masters 120-123. For example, the memory access monitor 180 may initially predict a HAL memory access pattern as the memory requirement of the first master 120 when the first processor 101 is a video processor. The crossbar interconnect 106 may assign the third channel 152 that has the large page size 162 to the first master 120 based on the initially predicted memory requirement of the first master 120. The memory access monitor 180 may gather data corresponding to the accesses of the multi-channel memory 110 by the first master 120 over a predetermined time interval, store the gathered data at the memory access table 182, and predict a second memory requirement of the first master 120 after the predetermined time interval. The memory access monitor 180 may assign a different channel of the multi-channel memory 110 to the first master 120 based on the second memory requirement. For example, the memory access monitor 180 may monitor memory accesses of the first master 120, determine that the first master 120 has a random memory access pattern, and assign the first channel 150 that has the small page size 160 to the first master 120 based on the second memory requirement.

Thus, when the memory access monitor 180 detects a change in a memory access pattern of a particular master of the masters 120-123, the crossbar interconnect 106 can change a memory channel of the multi-channel memory 110 that is assigned to the particular master. For example, the first master 120 may initially be assigned the third channel 152 of the multi-channel memory 110 having the large page size 162 based on a predicted HAL memory access pattern. When the memory access monitor 180 detects that the memory access pattern of the master 120 is a random memory access pattern, the crossbar interconnect 106 may assign the first channel 150 having the small page size 160 to the master 120.

By assigning channels 150-153 of the multi-channel memory 110 to each of the masters 120-123 based on predicted memory requirements of each of the masters 120-123 and based on a page size of each of the channels 150-153, page open power may be reduced and higher page hits for each of the masters 120-123 may be achieved. Reduced page open power may result in longer battery life in portable electronic devices. Higher page hits may result in faster retrieval of the data stored at the multi-channel memory 110. By using the memory access table 182 to gather data of the masters 120-123 accessing the multi-channel memory 110 over a pre-determined time interval, the crossbar interconnect 106 may periodically determine memory access patterns of each of the masters 120-123 and periodically assign/re-assign the memory channels 150-153 to the masters 120-123 to reduce page open power and increase page hits of the masters 120-123.

Figure 2:
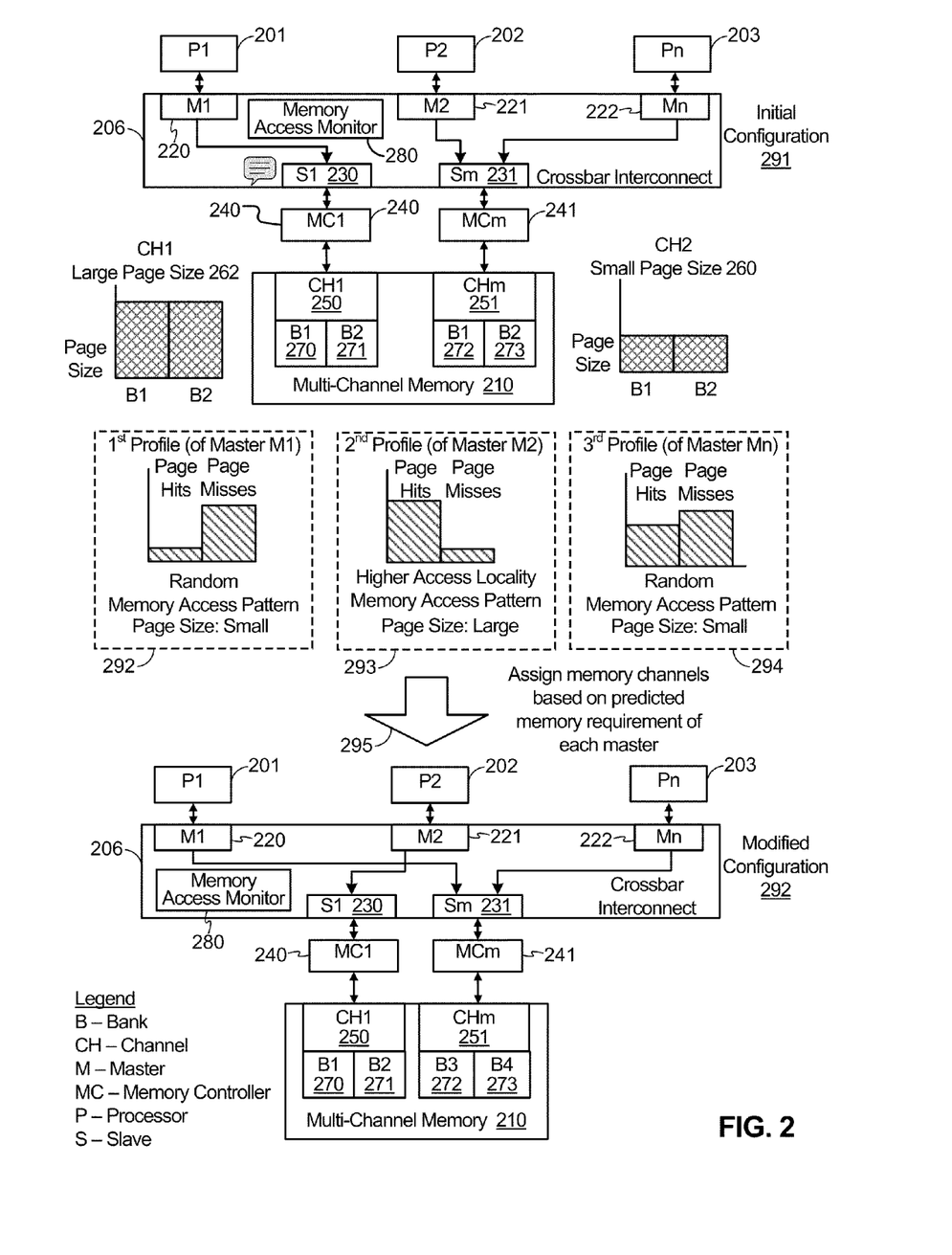
FIG. 2 is a general diagram of an illustrative embodiment of accessing a multi-channel memory system having non-uniform page sizes.

Referring to FIG. 2, a general diagram of an illustrative embodiment of accessing a multi-channel memory system having non-uniform page sizes is depicted and generally designated 200. The system 200 includes processors 201, 202, and 203 that access a multi-channel memory 210 via a crossbar interconnect 206 and via memory controllers 240 and 241.

The processors 201-203 may represent various processors that may be used to perform specialized functions in an electronic device. For example, the processors 201-203 may include a display control processor, a Coder-Decoder (CODEC) processor, Digital Signal Processor (DSP), other type of processor, or any combination thereof. The processors 201-203 may access data stored at the multi-channel memory 210 via the crossbar interconnect 206. For example, the processors 201-203 may read or write to portions of the multi-channel memory 210 via the crossbar interconnect 206.

The multi-channel memory 210 includes a first channel 250 and a second channel 251. Each channel of the multi-channel memory 210 may have one or more memory banks In the system 200, the first channel 250 has a first bank 270 and a second bank 271 and the second channel 251 has a first bank 272 and a second bank 273. The multi-channel memory 210 may store data using non-uniform page sizes. In the system 200, the banks 270-271 have a small page size 260 and the banks 272-273 have a large page size 262. In a particular embodiment, the multi-channel memory 210 may be a dual-data rate (DDR) memory. In another particular embodiment, the multi-channel memory 210 may be Through-Silicon Stacking (TSS) DDR memory. The multi-channel memory 210 may have an input/output operation width of at least 128 bits. The multi-channel memory 210 may be accessed via the memory controllers 240-241.

The crossbar interconnect 206 includes a first master 220, a second master 221, a third master 222, a first slave 230, a second slave 231, and a memory access monitor 280. The memory access monitor 280 may be substantially similar to the memory access monitor 180 of FIG. 1 and include at least the memory access table 182 and the first threshold 181. The crossbar interconnect 206 may include more one or more fabrics, where each fabric enables access to a subset of the multi-channel memory 210. For example, the crossbar interconnect 206 may enable access to several types of multi-channel memory and may therefore have multiple fabrics. The masters 220-222 may be bus masters that take control of a portion of the crossbar interconnect 206 in order to access the multi-channel memory 210. The masters 220-222 may receive commands to access the multi-channel memory 210 from the processors 201-203.

To access the multi-channel memory 210, a particular master of the masters 220-222 may send a memory access request to a particular slave of the slaves 230-231 and the particular slave may access one or more of the banks 270-273 of the multi-channel memory 210 via one of the memory controllers 240-241. After accessing the multi-channel memory 210, the particular slave of the slaves 230-231 may send a result of the memory access to the particular master of the masters 220-222. The particular master may send the result of the memory access to the processor that requested the memory access. For example, the first processor 201 may send a request to the first master 220 to read a particular memory location of the multi-channel memory 210. The first master 220 may receive the request from the first processor 210 and send a memory access request to the first slave 230 via the crossbar interconnect 206. The first slave 230 may receive the memory access request from the first master 220 and send a memory access request to the first memory controller 240. The first memory controller 240 may receive the memory access request, access the multi-channel memory 210 to perform the memory access request, and return a result of the memory access request to the first slave 230. The first slave 230 may send the result of the memory access request to the first master 220. The first master 220 may send the result of the memory access request to the first processor 201.

The memory access monitor 280 may predict a memory access pattern of a specific master of the masters 220-222, identify a page size associated with each of the banks 270-273 of the multi-channel memory 210, and assign a specific bank of the banks 270-273 to the particular master. The memory access monitor 280 may assign the specific bank of the multi-channel memory 210 to the particular master based on a predicted memory requirement of the particular master, the page size associated with the specific bank of the banks 270-273, a type of processor associated with the particular master, a type of content accessed by the particular master, or any combination thereof. For example, the memory access monitor 280 may assign the first channel 250 to the first master 220 after determining that the first processor 201 is a video processor.

The memory access monitor 280 may store data, such as various statistics, related to memory accesses for each of the masters 220-222. For example, the memory access monitor 280 may store a number of page hits corresponding to accesses of the multi-channel memory 210 by each of the masters 220-222 over a period of time and a number of page misses corresponding to accesses of the multi-channel memory 210 by each of the masters 220-222 over a period of time. The memory access monitor 280 may use the statistics, such as the page hits and page misses of each master to predict a memory access pattern for each of the masters 220-222. The crossbar interconnect 206 may assign a bank of the banks 270-273 to a master of the masters 220-222 based on the predicted memory access pattern of the master.

In operation, in an initial configuration 291, the bank 270 may be assigned to the first master 220, the bank 272 may be assigned to the second master 221, and the bank 273 may be assigned to the third master 222. For example, the bank 270 may be assigned to the first master 220 based on a type of the first processor 201, the bank 272 may be assigned to the second master 221 based on a type of the second processor 202, and the bank 273 may be assigned to the third master 222 based on a type of the $n^{th}$ processor 203.

The memory access monitor 280 may measure, over a period of time, a number of pages hits and page misses corresponding to accesses of the multi-channel memory 210 for each of the masters 220-222. The memory access monitor 280 may predict a memory access pattern for each of the masters 220-222 based on the number of page hits and the number of page hits for each of the masters 220-222. In the system 200, the memory access monitor 280 may predict that the first master 220 has a first profile 292 that includes a random memory access pattern when the first master 220 is measured to have fewer page hits than page misses over a particular period of time. The memory access monitor 280 may predict that the second master 221 has a second profile 293 including a higher access locality access pattern when the second master 221 is measured to have more page misses than page hits over a particular period of time. The memory access monitor 280 may predict that the third master 222 has a third profile 294 including the random memory access pattern when the third master 222 is measured to have fewer page hits than page misses over a particular period of time.

The crossbar interconnect 206 may modify the initial configuration 290 to create the modified configuration 291 by assigning different banks to one or more of the masters 220-222 based on a predicted memory access pattern of each of the masters 220-222, as represented by an arrow 295. For example, the crossbar interconnect 206 may assign the bank 272 to the first master 220 based on the predicted random memory access pattern because bank 272 has the small page size 260. The crossbar interconnect 206 may assign the bank 270 to the second master 221 based on the predicted higher access locality memory access pattern because bank 270 has the large page size 262. In this way, the crossbar interconnect 206 can assign the banks 270-273 to the masters 220-222 based on the predicted memory access pattern of the masters 220-222.

By assigning the banks 270-273 to the masters 220-222 based on the predicted memory access pattern of the masters 220-222, page open power may be reduced and higher page hits for each of the masters 220-222 may be achieved. Reduced page open power may result in longer battery life in portable electronic devices. Higher page hits may result in faster retrieval of the data stored at the multi-channel memory 210. The memory access monitor 280 may periodically determine memory access patterns of each of the masters 220-222 and the crossbar interconnect 206 may periodically assign/re-assign one or more of the banks 270-273 to the masters 220-222 to reduce page open power and to increase page hits of the masters 220-222.

Figure 3:
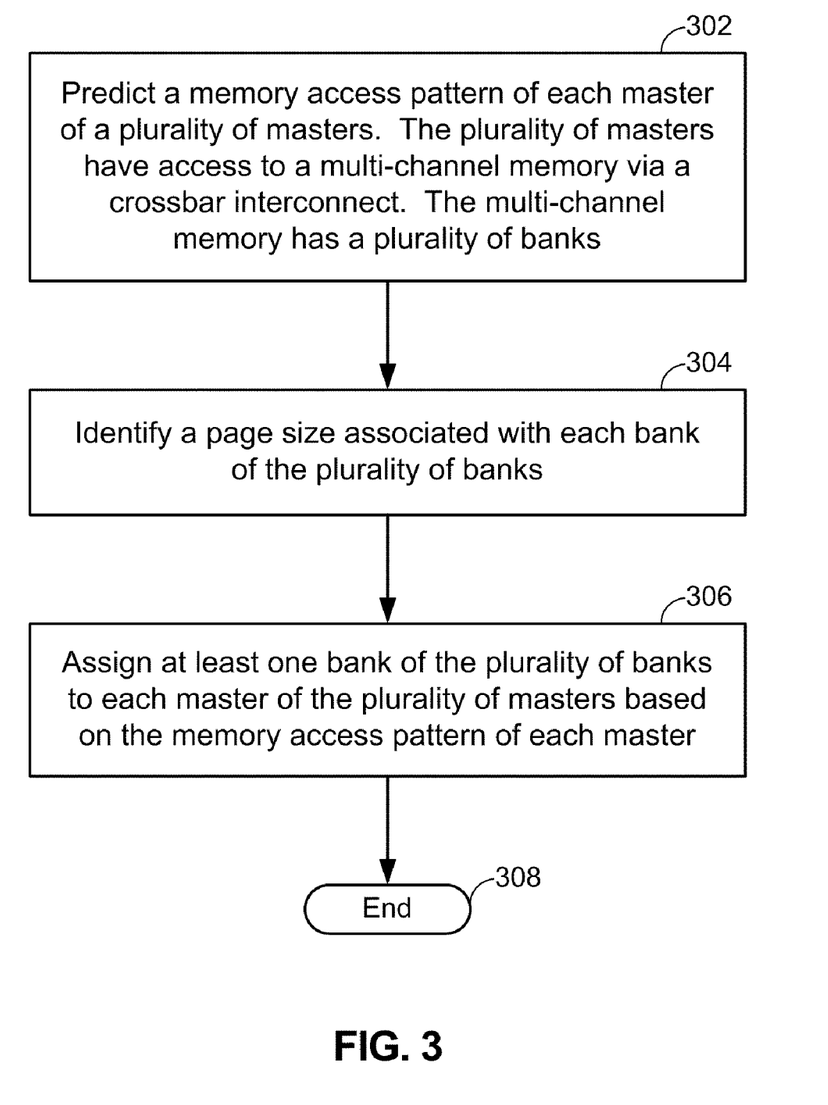
FIG. 3 is a flow diagram of a first illustrative embodiment of a method of accessing a multi-channel memory system having non-uniform page sizes.

FIG. 3 is a flow diagram of a first illustrative embodiment of a method of accessing a multi-channel memory system having non-uniform page sizes. The method may be performed by a crossbar interconnect, such as the crossbar interconnect 106 of FIG. 1 or the crossbar interconnect 206 of FIG. 2.

A memory access pattern of each master of a plurality of masters is predicted, at 302. The plurality of masters have access to a multi-channel memory via a crossbar interconnect. The multi-channel memory has a plurality of banks Moving to 304, a page size associated with each bank of the plurality of banks is identified. Proceeding to 306, at least one bank of the plurality of banks is assigned to each master of the plurality of masters based on the memory access pattern of each master. For example, in FIG. 2, the memory access monitor 280 may predict that the first master 220 has a random memory access pattern when the first master 220 is measured to have fewer page hits than page misses over a particular period of time. The crossbar interconnect 206 may assign the bank 272 to the first master 220 based on the predicted random memory access pattern because bank 272 has the small page size 260. The method ends, at 308.

Thus, by assigning a bank to a master based on a predicted memory access pattern of the master, page open power may be reduced and higher page hits for the master may be achieved. Reduced page open power may result in longer battery life in portable electronic devices. Higher page hits may result in faster access to data stored at the assigned bank.

Figure 4:
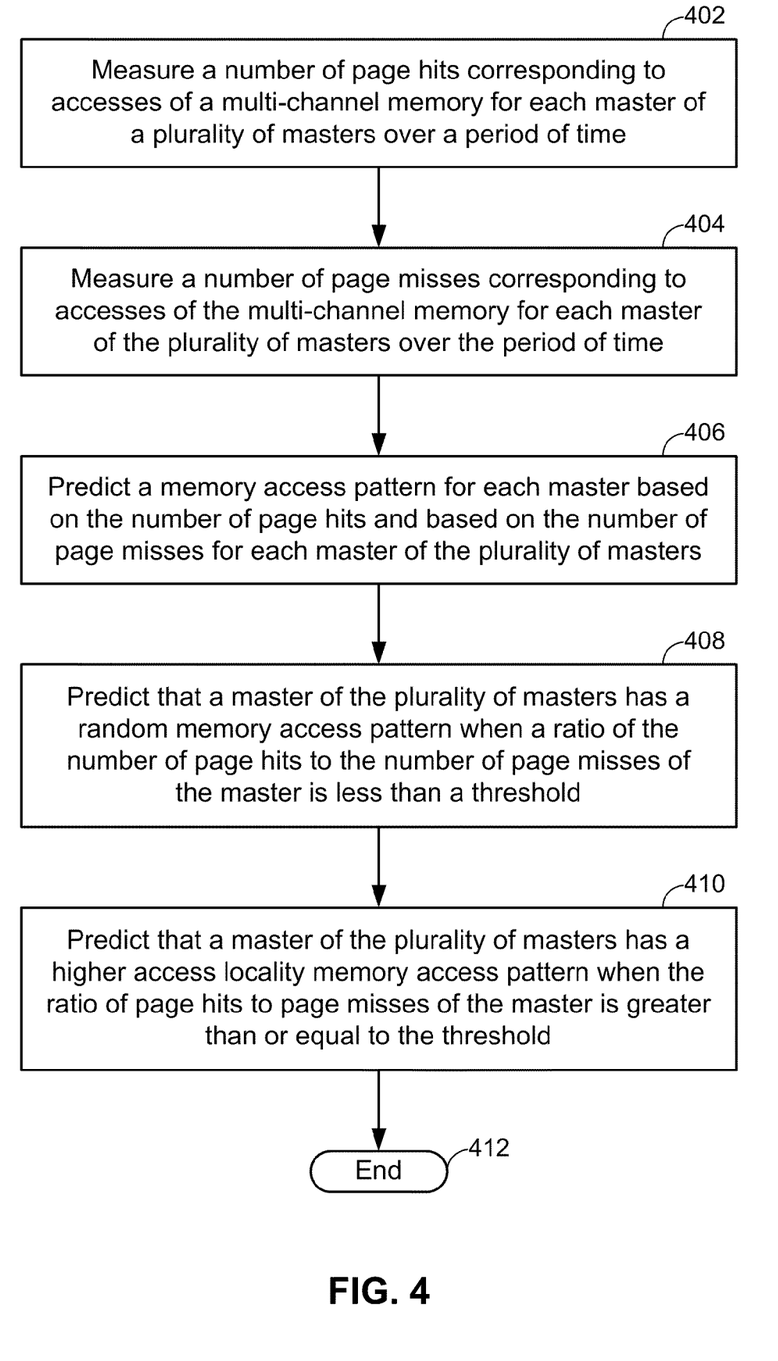
FIG. 4 is a flow diagram of a second illustrative embodiment of a method of accessing a multi-channel memory system having non-uniform page sizes.

FIG. 4 is a flow diagram of a second illustrative embodiment of a method of accessing a multi-channel memory system having non-uniform page sizes. The method may be performed by a crossbar interconnect, such as the crossbar interconnect 106 of FIG. 1 or the crossbar interconnect 206 of FIG. 2.

A number of page hits corresponding to accesses of the multi-channel memory is measured for each master of the plurality of masters over a period of time, at 402. Moving to 404, a number of page misses corresponding to accesses to the multi-channel memory is measured for each master of the plurality of masters over the period of time. To illustrate, in FIG. 1, the memory access monitor 180 may measure the page hits and the page misses for the masters 120-123 and store the measured page hits and the measured page misses at the memory access table 182. Advancing to 406, a memory access pattern is predicted for each master of the plurality of masters based on the number of page hits and based on the number of page misses. For example, a master of the plurality of masters may be predicted to have a random memory access pattern when a ratio of the number of page hits to the number of page misses of the master is less than a threshold, at 408. As another example, a master of the plurality of masters may be predicted to have a higher access locality memory access pattern when the ratio of page hits to page misses of the master is greater than or equal to the threshold, at 410. The method ends at 412.

Thus, by measuring a number of page hits and a number of page misses corresponding to accesses of a multi-channel memory by a master, a prediction can be made as to whether the master has a random memory access pattern or a higher access locality memory access pattern. The predicted memory access pattern of the master may be used to assign a bank or a channel of a multi-channel memory to increase the number of page hits and reduce page open power.

Figure 5:
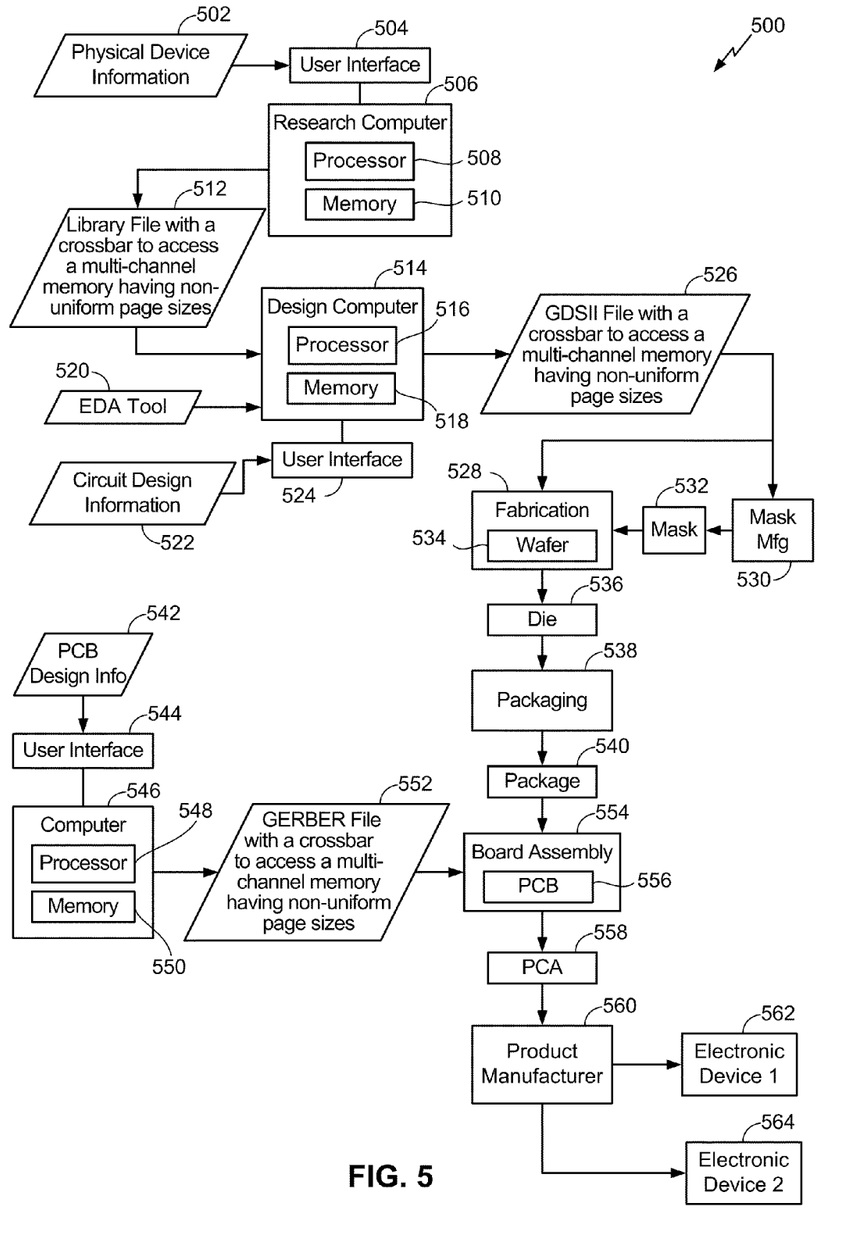
FIG. 5 is a general diagram of an illustrative embodiment of a method of manufacturing an integrated circuit device that includes a multi-channel memory system having non-uniform page sizes.

FIG. 5 is a general diagram of an illustrative embodiment of a method of manufacturing an integrated circuit device that includes a multi-channel memory system having non-uniform page sizes.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 5 depicts a particular illustrative embodiment of an electronic device manufacturing process 500.

Physical device information 502 is received in the manufacturing process 500, such as at a research computer 506. The physical device information 502 may include design information representing at least one physical property of a semiconductor device, such as the crossbar interconnect 106 of FIG. 1, the crossbar interconnect 206 of FIG. 2, or any combination thereof. For example, the physical device information 502 may include physical parameters, material characteristics, and structure information that is entered via a user interface 504 coupled to the research computer 506. The research computer 506 includes a processor 508, such as one or more processing cores, coupled to a computer readable medium such as a memory 510. The memory 510 may store computer readable instructions that are executable to cause the processor 508 to transform the physical device information 502 to comply with a file format and to generate a library file 512.

In a particular embodiment, the library file 512 includes at least one data file including the transformed design information. For example, the library file 512 may include a library of semiconductor devices including the crossbar interconnect 106 of FIG. 1, the crossbar interconnect 206 of FIG. 2, or any combination thereof, that is provided for use with an electronic design automation (EDA) tool 520.

The library file 512 may be used in conjunction with the EDA tool 520 at a design computer 514 including a processor 516, such as one or more processing cores, coupled to a memory 518. The EDA tool 520 may be stored as processor executable instructions at the memory 518 to enable a user of the design computer 514 to design a circuit using the crossbar interconnect 106 of FIG. 1, the crossbar interconnect 206 of FIG. 2, or any combination thereof, of the library file 512. For example, a user of the design computer 514 may enter circuit design information 522 via a user interface 524 coupled to the design computer 514. The circuit design information 522 may include design information representing at least one physical property of a semiconductor device, such as the crossbar interconnect 106 of FIG. 1, the crossbar interconnect 206 of FIG. 2, or any combination thereof. To illustrate, the circuit design property may include identification of particular circuits and relationships to other elements in a circuit design, positioning information, feature size information, interconnection information, or other information representing a physical property of a semiconductor device.

The design computer 514 may be configured to transform the design information, including the circuit design information 522, to comply with a file format. To illustrate, the file formation may include a database binary file format representing planar geometric shapes, text labels, and other information about a circuit layout in a hierarchical format, such as a Graphic Data System (GDSII) file format. The design computer 514 may be configured to generate a data file including the transformed design information, such as a GDSII file 526 that includes information describing the crossbar interconnect 106 of FIG. 1, the crossbar interconnect 206 of FIG. 2, or any combination thereof, in addition to other circuits or information. To illustrate, the data file may include information corresponding to a system-on-chip (SOC) that includes at least one of the crossbar interconnect 106 of FIG. 1, the crossbar interconnect 206 of FIG. 2, and that also includes additional electronic circuits and components within the SOC.

The GDSII file 526 may be received at a fabrication process 528 to manufacture the crossbar interconnect 106 of FIG. 1, the crossbar interconnect 206 of FIG. 2, or any combination thereof, according to transformed information in the GDSII file 526. For example, a device manufacture process may include providing the GDSII file 526 to a mask manufacturer 530 to create one or more masks, such as masks to be used for photolithography processing, illustrated as a representative mask 532. The mask 532 may be used during the fabrication process to generate one or more wafers 534, which may be tested and separated into dies, such as a representative die 536. The die 536 includes a circuit including the crossbar interconnect 106 of FIG. 1, the crossbar interconnect 206 of FIG. 2, or any combination thereof.

The die 536 may be provided to a packaging process 538 where the die 536 is incorporated into a representative package 540. For example, the package 540 may include the single die 536 or multiple dies, such as a system-in-package (SiP) arrangement. The package 540 may be configured to conform to one or more standards or specifications, such as Joint Electron Device Engineering Council (JEDEC) standards.

Information regarding the package 540 may be distributed to various product designers, such as via a component library stored at a computer 546. The computer 546 may include a processor 548, such as one or more processing cores, coupled to a memory 510. A printed circuit board (PCB) tool may be stored as processor executable instructions at the memory 550 to process PCB design information 542 received from a user of the computer 546 via a user interface 544. The PCB design information 542 may include physical positioning information of a packaged semiconductor device on a circuit board, the packaged semiconductor device corresponding to the package 540 including the crossbar interconnect 106 of FIG. 1, the crossbar interconnect 206 of FIG. 2, or any combination thereof.

The computer 546 may be configured to transform the PCB design information 542 to generate a data file, such as a GERBER file 552 with data that includes physical positioning information of a packaged semiconductor device on a circuit board, as well as layout of electrical connections such as traces and vias, where the packaged semiconductor device corresponds to the package 540 including the crossbar interconnect 106 of FIG. 1, the crossbar interconnect 206 of FIG. 2, or any combination thereof. In other embodiments, the data file generated by the transformed PCB design information may have a format other than a GERBER format.

The GERBER file 552 may be received at a board assembly process 554 and used to create PCBs, such as a representative PCB 556, manufactured in accordance with the design information stored within the GERBER file 552. For example, the GERBER file 552 may be uploaded to one or more machines for performing various steps of a PCB production process. The PCB 556 may be populated with electronic components including the package 540 to form a represented printed circuit assembly (PCA) 558.

The PCA 558 may be received at a product manufacture process 560 and integrated into one or more electronic devices, such as a first representative electronic device 562 and a second representative electronic device 564. As an illustrative, non-limiting example, the first representative electronic device 562, the second representative electronic device 564, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 562 and 564 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-2 may illustrate remote units according to the teachings of the disclosure, the disclosure is not limited to these exemplary illustrated units. Embodiments of the disclosure may be suitably employed in any device which includes active integrated circuitry including memory and on-chip circuitry for test and characterization.

Thus, the crossbar interconnect 106 of FIG. 1, the crossbar interconnect 206 of FIG. 2, or any combination thereof, may be fabricated, processed, and incorporated into an electronic device, as described in the illustrative process 500. One or more aspects of the embodiments disclosed with respect to FIGS. 1-3 may be included at various processing stages, such as within the library file 512, the GDSII file 526, and the GERBER file 552, as well as stored at the memory 510 of the research computer 506, the memory 518 of the design computer 514, the memory 550 of the computer 546, the memory of one or more other computers or processors (not shown) used at the various stages, such as at the board assembly process 554, and also incorporated into one or more other physical embodiments such as the mask 532, the die 536, the package 540, the PCA 558, other products such as prototype circuits or devices (not shown), or any combination thereof. Although various representative stages of production from a physical device design to a final product are depicted, in other embodiments fewer stages may be used or additional stages may be included. Similarly, the process 500 may be performed by a single entity, or by one or more entities performing various stages of the process 500.

Figure 6:
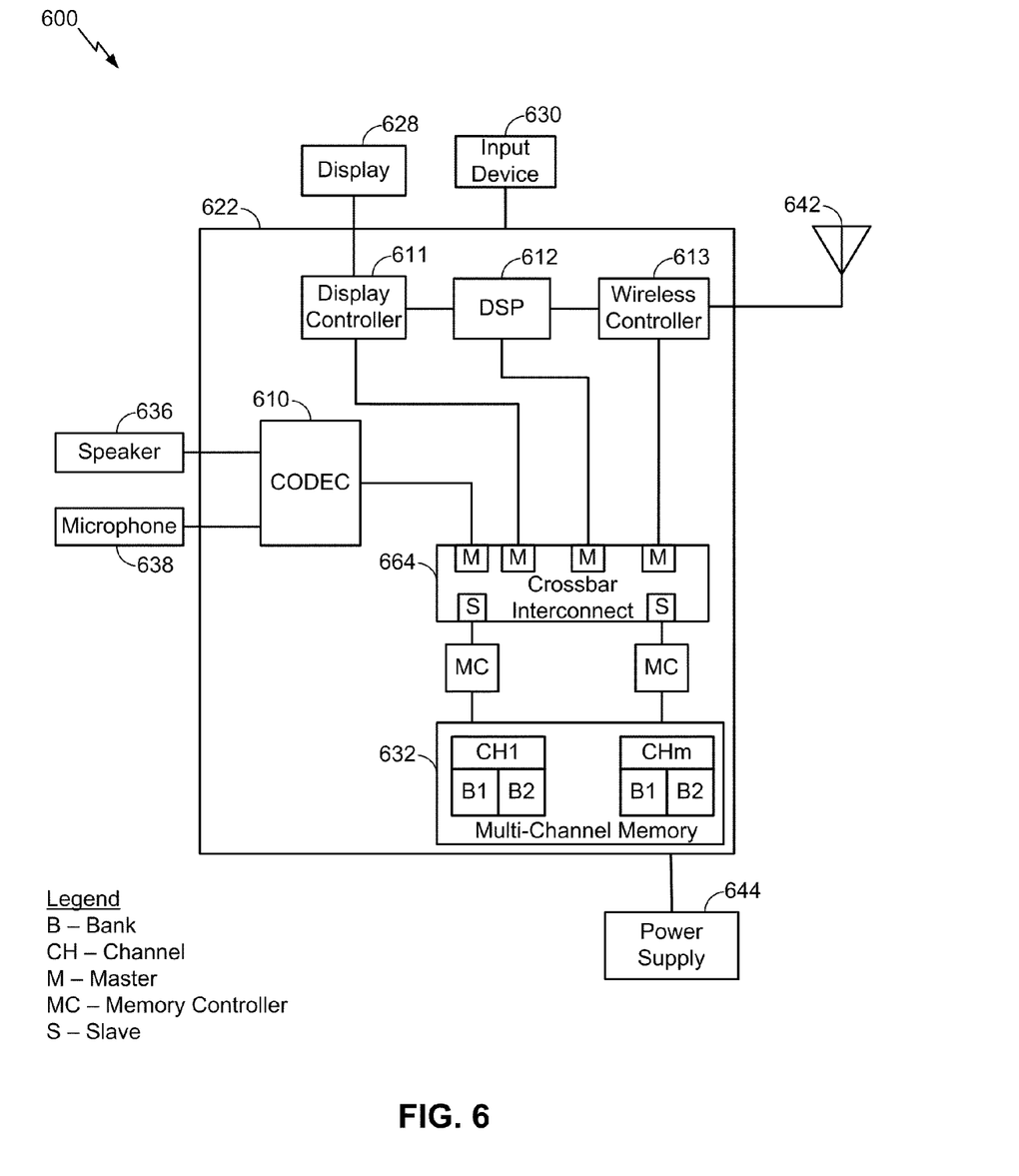
FIG. 6 is a block diagram of an illustrative embodiment of an electronic device that includes a multi-channel memory system having non-uniform page sizes.

Referring to FIG. 6, a block diagram of an illustrative embodiment of an electronic device that includes a multi-channel memory system having non-uniform page sizes is depicted and generally designated 600. For example, the system 600 may be an electronic device such as a Personal Digital Assistant (PDA), a wireless mobile device, a computing device, other type of device, or any combination thereof. The device 600 includes four processors: a Coder-Decoder (CODEC) 610, a display controller 611, a digital signal processor (DSP) 612, and a wireless controller 613. The processors 610-613 are coupled to a multi-channel memory 632 via a crossbar interconnect 664. The crossbar interconnect 664 may include one or more masters and one or more slaves. In an illustrative example, the system 600 includes the multi-channel memory 110 of FIG. 1 or the multi-channel memory 210 of FIG. 2 and has circuit parameters determined using one or more of the systems of FIGS. 1-2, and incorporates one or more of the methods of FIGS. 3-4, or any combination thereof. The multi-channel memory 632 may have m channels, and each channel may have one or more banks.

The display controller 611 is coupled to the DSP 612 and to a display 628. The CODEC 610 can also be coupled to the DSP 612. A speaker 636 and a microphone 638 can be coupled to the CODEC 610.

The wireless controller 613 can be coupled to the DSP 612 and to a wireless antenna 642. In a particular embodiment, the DSP 612, the display controller 611, the memory 632, the CODEC 610, the wireless controller 613, and the partitioned crossbar interconnect 664 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
    a crossbar interconnect configured to:
        predict a memory requirement of a master having access to a multi-channel memory;
        identify a page size associated with each channel of the multi-channel memory; and
        assign a first particular channel of the multi-channel memory to the master based on the predicted memory requirement of the master and based on the page size associated with the first particular channel.

2. The apparatus of claim 1, wherein the memory requirement of the master is predicted based on a type of a processor associated with the master.

3. The apparatus of claim 2, wherein the type of the processor associated with the master is one of a multiplexing data processor, a digital signal processor, a video processor, a standard control processor, a master control processor, a multiplexer-demultiplexer, a coder-decoder processor, a modem processor, a display processor, and a graphics processor.

4. The apparatus of claim 1, wherein the crossbar interconnect is configured to:
    predict a second memory requirement of the master after a predetermined time interval; and
    assign a second particular channel of the multi-channel memory to the master based on the second memory requirement of the master, wherein the second particular channel has a page size that is different than the first particular channel.

5. The apparatus of claim 1, wherein the memory requirement of the master is predicted based on a memory access pattern of the master.

6. The apparatus of claim 5, wherein the crossbar interconnect is configured to assign a second particular channel of the multi-channel memory to the master in response to detecting a change in the memory access pattern of the master.

7. The apparatus of claim 5, wherein the crossbar interconnect is configured to predict that the memory requirement of the master corresponds to a large page size after determining that the memory access pattern of the master is a high access locality memory access pattern.

8. The apparatus of claim 7, wherein determining that the memory access pattern of the master is the high access locality memory access pattern comprises determining that the master has a ratio of page hits to page misses that is less than a threshold.

9. The apparatus of claim 5, wherein the crossbar interconnect is configured to predict that the memory requirement of the master corresponds to a small page size after determining that the memory access pattern of the master is a random memory access pattern.

10. The apparatus of claim 9, wherein determining that the memory access pattern of the master is the random memory access pattern comprises determining that the master has a ratio of page hits to page misses that is greater than or equal to a threshold.

11. The apparatus of claim 1, wherein the crossbar interconnect is configured to route messages from the master to one or more slaves, and wherein the one or more slaves access a portion of the multi-channel memory via at least one memory controller.

12. The apparatus of claim 1, wherein the multi-channel memory comprises double data rate random access memory (DDR RAM).

13. The apparatus of claim 12, wherein the multi-channel memory comprises Through Silicon Stacking (TSS) stacked DDR RAM.

14. The apparatus of claim 13, wherein the TSS stacked DDR RAM is capable of performing input-output operations at a width of at least 128 bits.

15. The apparatus of claim 1, wherein the multi-channel memory comprises a vertically stacked memory.

16. The apparatus of claim 15, wherein the multi-channel memory is stacked vertically using at least one through-silicon via (TSV).

17. The apparatus of claim 1, wherein the crossbar interconnect is integrated in at least one semiconductor die.

18. The apparatus of claim 17, further comprising a device selected from the group consisting of a set top box, a music player, a video player, an entertainment unit, a navigation device, a communications device, a personal digital assistant (PDA), a fixed location data unit, and a computer, into which the at least one semiconductor die is integrated.

19. An apparatus comprising:
    means for predicting a page size requirement of a master having access to a multi-channel memory;
    means for identifying a page size associated with each channel of the multi-channel memory;
    means for assigning a channel of the multi-channel memory to the master based on the page size requirement of the master and based on the page size associated with the channel; and
    wherein one of said means is implemented in hardware.

20. The apparatus of claim 19, wherein the means for predicting the page size requirement, the means for identifying the page size, and the means for assigning the channel are integrated in at least one semiconductor die.

21. The apparatus of claim 20, further comprising a device selected from the group consisting of a set top box, a music player, a video player, an entertainment unit, a navigation device, a communications device, a personal digital assistant (PDA), a fixed location data unit, and a computer, into which the at least one semiconductor die is integrated.

22. A method, comprising:
    predicting a memory access pattern of each master of a plurality of masters, the plurality of masters having access to a multi-channel memory via a crossbar interconnect, wherein the multi-channel memory has a plurality of banks;
    identifying a page size associated with each bank of the plurality of banks; and
    assigning at least one bank of the plurality of banks to each master of the plurality of masters based on the memory access pattern of each master.

23. The method of claim 22, wherein the memory access pattern of each master of the plurality of masters is predicted based on a type of processor associated with each master of the plurality of masters.

24. The method of claim 22, wherein the memory access pattern of each master of the plurality of masters is predicted based on a type of content accessed by each master of the plurality of masters.

25. The method of claim 24, wherein predicting the memory access pattern of each master of the plurality of masters further comprises:
measuring a number of page hits corresponding to accesses to the multi-channel memory of each master of the plurality of masters over the period of time;
measuring a number of page misses corresponding to accesses to the multi-channel memory of each master of the plurality of masters over the period of time;
predicting the memory access pattern for each master based on the number of page hits and based on the number of page misses of each master of the plurality of masters.

26. The method of claim 25, further comprising predicting that a master of the plurality of masters has a random memory access pattern when the number of page hits of the master is less than the number of page misses of the master.

27. The method of claim 25, further comprising predicting that a master of the plurality of masters has a higher access locality memory access pattern when the number of page hits of the master is greater than or equal to the number of page misses of the master.

28. The method of claim 22, wherein the page size is one of a large page size and a small page size.

29. The method of claim 22, wherein the page size is one of a large page size, a medium page size, and a small page size.

30. The method of claim 22, wherein predicting the memory access pattern of each master of the plurality of masters, identifying the page size associated with each bank of the plurality of banks, and assigning at least one bank of the plurality of banks to each master of the plurality of masters based on the memory access pattern of each master are performed at a processor integrated into an electronic device.

31. A method comprising:
a first step for predicting a memory requirement of a master having access to a multi-channel memory;
a second step for identifying a page size associated with each channel of the multi-channel memory; and
a third step for assigning a channel of the multi-channel memory to the master based on the memory requirement of the master and based on the page size associated with the channel.

32. The method of claim 31, wherein the first step, the second step, and the third step are performed by a processor integrated into an electronic device.

33. A non-transitory computer readable medium comprising instructions that, when executed by a processor, cause the processor to:
predict a memory requirement of a master having access to a multi-channel memory;
identify a page size associated with each channel of the multi-channel memory; and
assign a channel of the multi-channel memory to the master based on the predicted memory requirement of the master and based on the page size associated with the channel.

34. The non-transitory computer readable medium of claim 33, wherein the processor is integrated into a device selected from the group consisting of a set top box, a music player, a video player, an entertainment unit, a navigation device, a communications device, a personal digital assistant (PDA), a fixed location data unit, and a computer.

35. A method comprising:
receiving design information representing at least one physical property of a semiconductor device, the semiconductor device comprising:
a multi-channel memory, each channel connected to at least one memory bank; and
a crossbar interconnect configured to:
predict a memory requirement of a master having access to the multi-channel memory;
identify a page size associated with each channel of the multi-channel memory; and
assign a channel of the multi-channel memory to the master based on the predicted memory requirement of the master and based on the page size associated with the channel;
transforming the design information to comply with a file format; and
generating a data file including the transformed design information.

36. The method of claim 35, wherein the data file includes a GDSII format.

37. A method comprising:
receiving a data file including design information corresponding to a semiconductor device and fabricating the semiconductor device according to the design information, wherein the semiconductor device comprises:
a multi-channel memory, each channel connected to at least one memory bank; and
a crossbar interconnect configured to:
predict a memory requirement of a master having access to the multi-channel memory;
identify a page size associated with each channel of the multi-channel memory; and
assign a channel of the multi-channel memory to the master based on the predicted memory requirement of the master and based on the page size associated with the channel.

38. The method of claim 37, wherein the data file has a GDSII format.

39. A method comprising:
receiving design information including physical positioning information of a packaged semiconductor device on a circuit board, the packaged semiconductor device including a semiconductor structure comprising:
a multi-channel memory, each channel connected to at least one memory bank; and
a crossbar interconnect configured to:
predict a memory requirement of a master having access to the multi-channel memory;
identify a page size associated with each channel of the multi-channel memory; and
assign a channel of the multi-channel memory to the master based on the predicted memory requirement of the master and based on the page size associated with the channel.

40. The method of claim 39, wherein the data file has a GERBER format.

41. A method comprising:
receiving a data file including design information including physical positioning information of a packaged semiconductor device on a circuit board; and manufacturing the circuit board configured to receive the packaged semiconductor device according to the design information, wherein the packaged semiconductor device comprises:

a multi-channel memory, each channel connected to at least one memory bank; and a crossbar interconnect configured to:

predict a memory requirement of a master having access to the multi-channel memory;

identify a page size associated with each channel of the multi-channel memory; and assign a channel of the multi-channel memory to the master based on the predicted memory requirement of the master and based on the page size associated with the channel.

42. The method of claim 41, wherein the data file has a GERBER format.

43. The method of claim 41, further comprising integrating the circuit board into a device selected from the group consisting of a set top box, a music player, a video player, an entertainment unit, a navigation device, a communications device, a personal digital assistant (PDA), a fixed location data unit, and a computer.

* * * * *